United States Patent [19]

Gunzel, Jr. et al.

[11] E Re. 29,405

[45] Reissued Sept. 20, 1977

[54] SPRAY APPARATUS

[75] Inventors: Rudolph M. Gunzel, Jr., San Marino; Donald R. James, West Covina; Tony Radecki, Altadena, all of Calif.

[73] Assignee: Meiko, Incorporated, Los Angeles, Calif.

[21] Appl. No.: 673,309

[22] Filed: Apr. 2, 1976

Related U.S. Patent Documents

Reissue of:

[64] Patent No.: 3,940,069
Issued: Feb. 24, 1976
Appl. No.: 510,764
Filed: Sept. 30, 1974

U.S. Applications:

[63] Continuation-in-part of Ser. No. 408,175, Oct. 19, 1973, abandoned.

[51] Int. Cl.[2] ..... B05B 7/04; B05B 7/30; B05B 1/16

[52] U.S. Cl. ..... 239/318; 222/331; 222/335; 222/400.7; 239/142; 239/394; 239/396; 239/436

[58] Field of Search ..... 239/142, 302, 310, 315, 239/317, 318, 337, 338, 340, 342, 353, 354, 364, 367, 373, 375, 391, 392, 394, 396, 397, 407, 433, 436, 437, 596; 222/153, 330, 331, 335, 395, 400.7, 402.14–402.17; 215/252, 307, 317, 321, 329, 331, 332, 337; 220/293, 298, 300–302, 306–307

[56] References Cited

U.S. PATENT DOCUMENTS

| | | | |
|---|---|---|---|
| 1,992,426 | 2/1935 | Herbsman et al. | 239/353 X |
| 2,719,704 | 10/1955 | Anderson et al. | 239/318 X |
| 3,062,415 | 11/1962 | Anderson | 239/397 X |
| 3,112,885 | 12/1963 | Bell et al. | 239/436 X |
| 3,291,395 | 12/1966 | Sharp | 239/394 X |
| 3,381,899 | 5/1968 | Forsman | 239/317 |
| 3,764,074 | 10/1973 | James | 239/318 |
| 3,770,205 | 11/1973 | Proctor et al. | 239/317 |

*Primary Examiner*—Evon C. Blunk
*Assistant Examiner*—Andres Kashnikow
*Attorney, Agent, or Firm*—George J. Netter

[57] ABSTRACT

A caplike member is received onto a container for including a supply of materials to be sprayed onto lawns, shrubs and the like. A swivel nut mounted on the caplike member interconnects with, say, a water hose. A rotatable drumlike body on the caplike member has a pair of inserts with different sized bores passing therethrough, and which bores or passages are selectively positionable in alignment with a feed opening connected to inlet water, which tube lower end has a single proportion balance control orifice. The insert openings have lateral communication channels opening into a feed tube that extends into the container. A nozzle is rotatably affixed to the drumlike body and is individually adjustable to select any one of several exit openings which form different spray patterns. A further aspect is the provision of a hand operable valving device which directs inlet water into the container as a pressurized jet for initial mixing with the spray materials. Moreover, the feed tube lower end is secured within a sediment trap which positions it closely adjacent the container bottom in a manner permitting free communication with the surrounding materials. A double filter on the feed tube lower end removes suspended matter.

26 Claims, 12 Drawing Figures

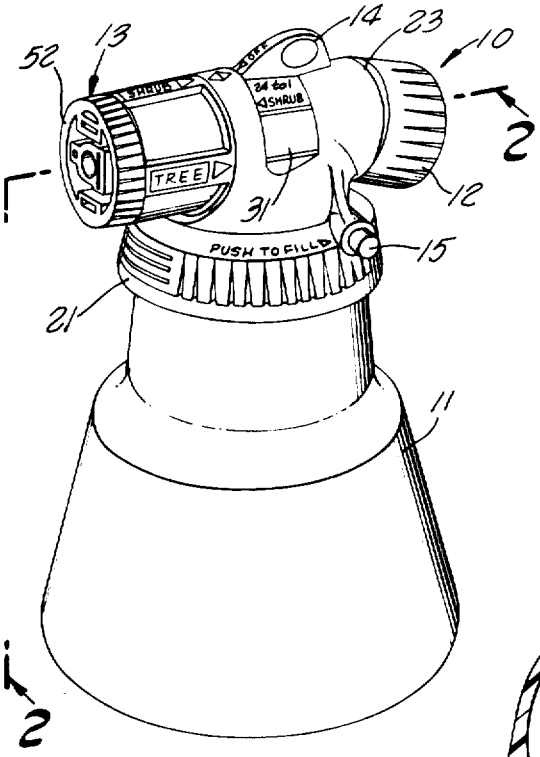
FIG. 1.
FIG. 3.
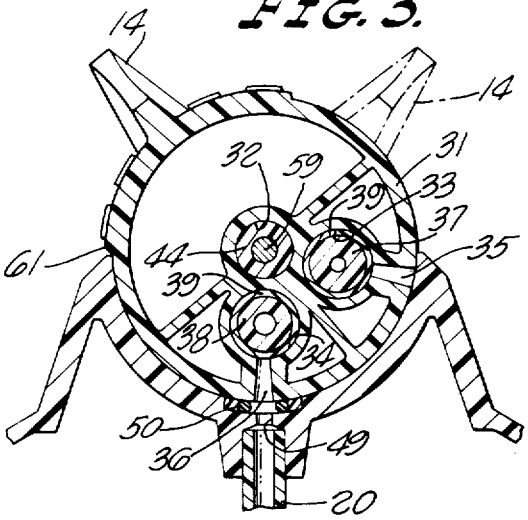
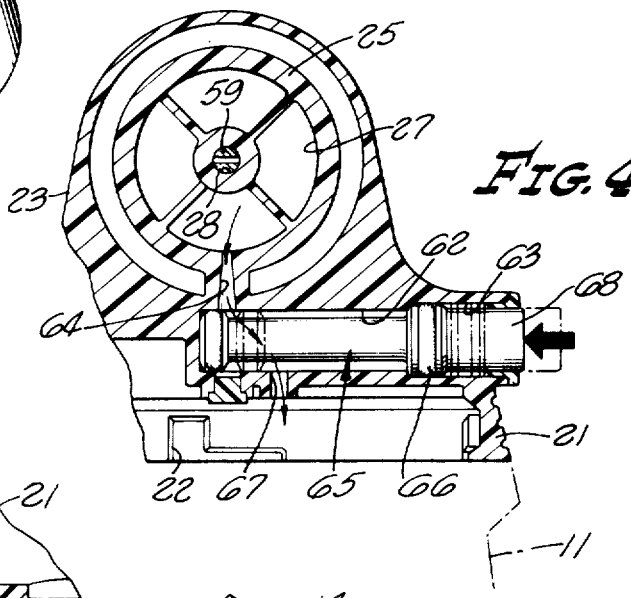
FIG. 4.
FIG. 5.
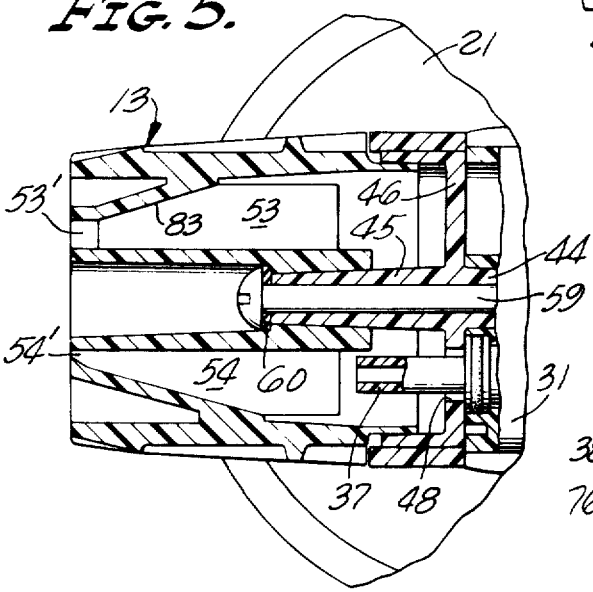
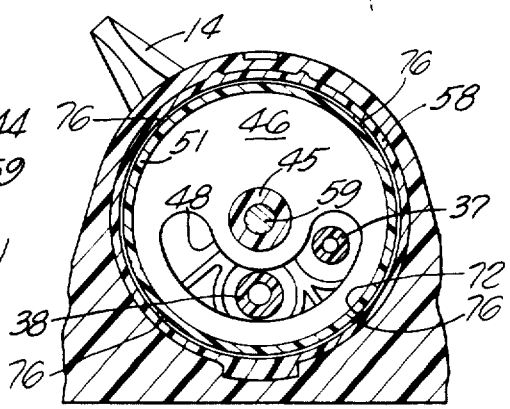
FIG. 6.

SPRAY APPARATUS

Matter enclosed in heavy brackets [ ] appears in the original patent but forms no part of this reissue specification; matter printed in italics indicates the additions made by reissue.

*The subject application is a Continuation-In-Part application of Serial No. 408,175, filed Oct. 19, 1973, now abandoned.*

The present invention relates generally to spray apparatus, and, in particular, to spray apparatus selectively adaptable for admixing such premix materials as fertilizers, insecticides, herbicides and fungicides with water for spraying lawns, shrubs, trees and other plants.

BACKGROUND OF THE INVENTION

Although in the past a number of different types of spray apparatus have been developed, none of such known apparatus has been completely satisfactory for one or more reasons. First of all, it is desirable that such apparatus be capable of efficiently and accurately admixing planting materials such as fertilizers, herbicides, insecticides, fungicides and the like, with a pressurized water stream, and known equipment for doing this has been relatively complex and expensive, and not sufficiently accurate. Moreover, in the past, where an attempt was made to avoid complexity and/or expense, the resulting devices were found to be generally unreliable.

It has also been found desirable for the spray apparatus to be capable of exerting a spray outlet at several different, selectively provided flow rates with prescribed ratios of water to premix materials. Still further, since such equipment is conventionally connected to a water hose and includes a container within which the fertilizer, insecticide, or the like is carried, all of which is hand carried, adjustability of the spray pattern over a wide range is clearly advantageous in providing the optimal spray for particular applications while eliminating the need for holding the apparatus at awkward and tiring angles during use. Again, past systems capable of providing different spray flow and proportions in a variety of dispensing patterns were expensive and complicated to manufacture, or, where designed with an eye toward reducing expense, suffered a significant drop in reliability. Also, the accuracy of proportioning premix materials with water is of critical importance with many materials, and previous known devices for doing this have simply not been suitably accurate for many materials.

With the many different kinds of fertilizers, insecticides, herbicides and the like available on the market, it is necessary that the apparatus used be capable of providing a specified ratio of mixing for each material prior to use, and this has either been relatively difficult to accomplish with prior equipment or not possible at all. For example, in certain types of known spray equipment, the material container has to be removed from the spray equipment and mixing performed within the open container, after which it must be reassembled for use. This, of course, takes time and occasionally produces the undesirable result of the user getting the water and materials onto his hands and clothing, which, since the materials are quite frequently toxic, can be dangerous to the user.

OBJECTS AND SUMMARY OF THE INVENTION

It is, therefore, a primary aim and object of the subject invention to provide improved spray apparatus for connection to a water hose for the application of fertilizers, insecticides or the like in a water spray solution onto lawns, shrubbery, trees and other plants.

Another object is the provision of spray apparatus which is selectively adjustable to provide a spray output at any one of several different flow rates and prescribed proportions of premix materials to water.

Another object is the provision of spray apparatus having an adjustable nozzle for forming the spray output into any one of a number of different optional patterns irrespective of flow rate adjustment.

Yet another object is the provision of spray apparatus for convenient removable attachment to a container of materials to be admixed with water spray and including mean selectively actuatable to direct pressurized water into the container and achieve mixing therewith.

Another object is the provision of spray apparatus having multiple means selectively alignable with inlet pressurized water to provide different flow rates, and a conduit interconnecting the selectively alignable means with premix materials via a single balance control orifice for entraining premix materials in the pressurized water prior to spray emission.

A still further object is the provision in spray apparatus of means securing the end of a feed tube in the bottom of a premix material container.

In accordance with the practice of the present invention, a caplike member is received onto a container which includes a supply of materials to be sprayed onto lawns, shrubbery and the like. A swivel nut is mounted onto the caplike member for interconnection with a water hose, for example. A rotatable drumlike body, also mounted on the caplike member, includes a pair of passages of different cross-sectional area passing therethrough, and which passages are selectively positionable in alignment with a feed opening communicating with a water source via the hose fitting or bit. The passages in the drumlike body have lateral communication channels opening into a feed tube which extends down into the container and terminates in a single proportion balance control orifice. A nozzle is rotatably affixed to the drumlike body and includes a plurality of exit openings therein which on adjustment forms a spray directed either upwardly or downwardly, in a narrow stream that extends generally straight out from the nozzle, or in a broad spray for use in applying fertilizers and insecticides onto lawns. The nozzle adjustment can be made separately of the drumlike body adjustment.

A further aspect of the invention includes a hand operable valving device which directs water from the hose into the container as a pressurized conical jet for initial mixing with the spray materials to a prescribed ratio.

The feed tube lower end is sealed within a sediment trap which positions it closely adjacent the container bottom in a manner [premitting] *permitting* free communication with the surrounding materials over a full 360° about the tube end. Double filtering removes suspended matter from the mixed materials prior to emission as a spray.

DESCRIPTION OF THE DRAWINGS

FIG. 1 is a perspective view of the spray apparatus and associated container of the subject invention.

FIG. 3 is a transverse sectional view taken along the line 3—3 in FIG. 2.

FIG. 4 is a sectional view taken along the line 4—4 of FIG. 2.

FIG. 5 is a plan, sectional, partially fragmentary view of the nozzle taken along line 5—5 of FIG. 2.

FIG. 6 is a sectional view taken along line 6—6 of FIG. 2.

DESCRIPTION OF A PREFERRED EMBODIMENT

Figure 2:
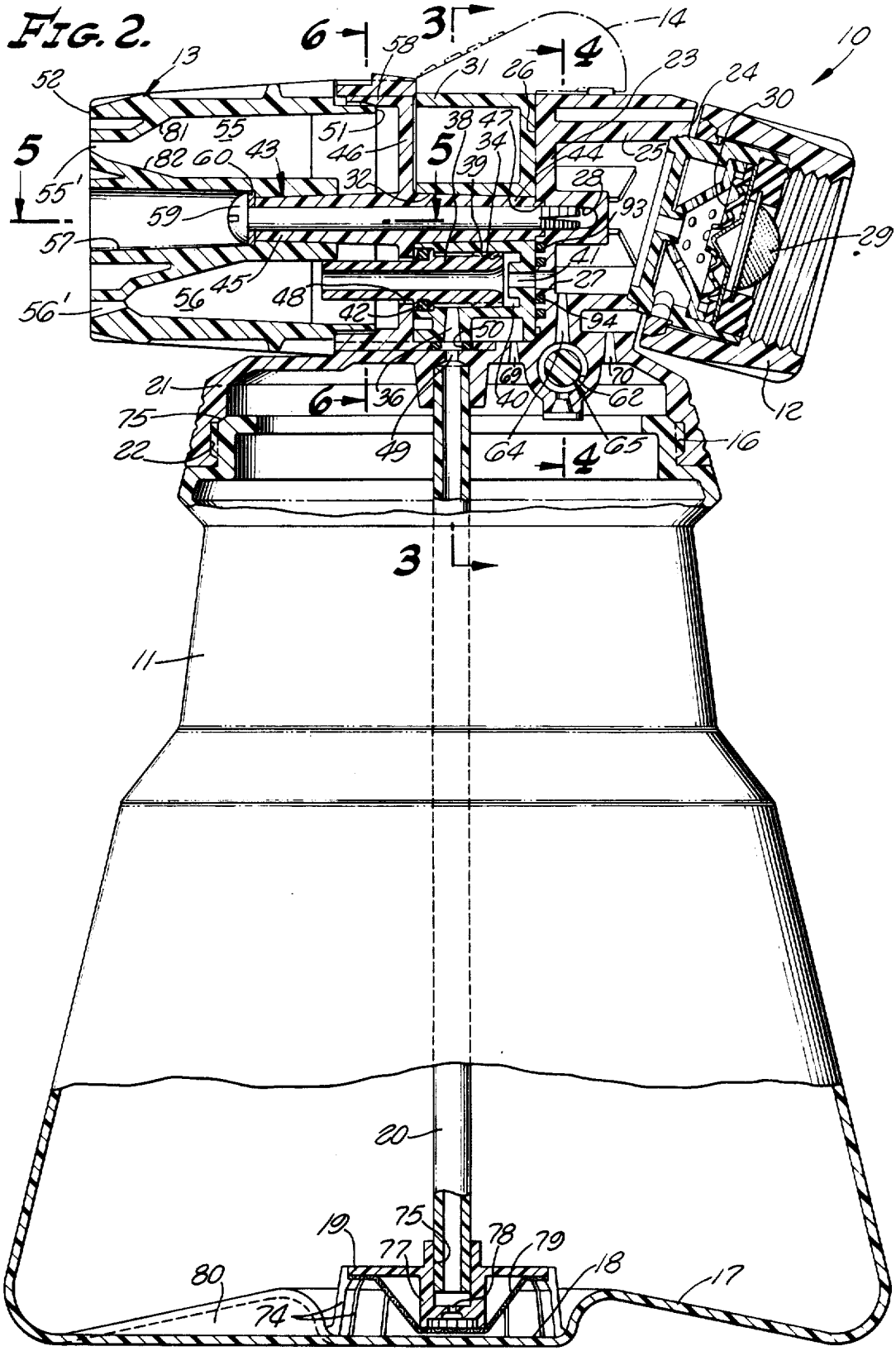
FIG. 2 is a side elevational, sectional view of the spray apparatus and container, taken along line 2—2 of FIG. 1.
Figure 7:
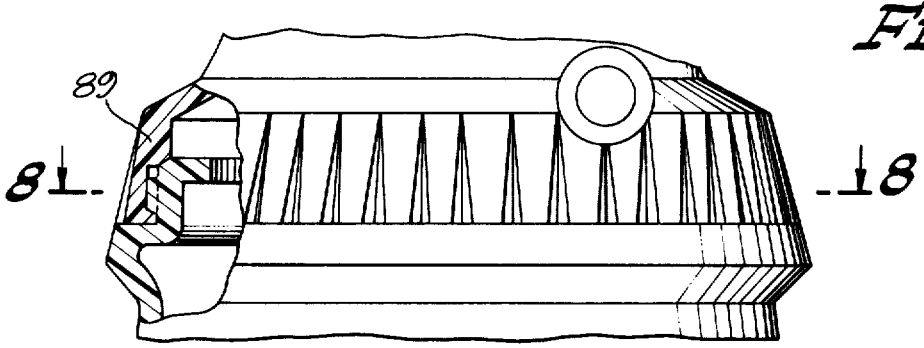
FIG. 7 is an elevational, partially sectional view of an alternate form of cap and container closure technique.
Figure 8:
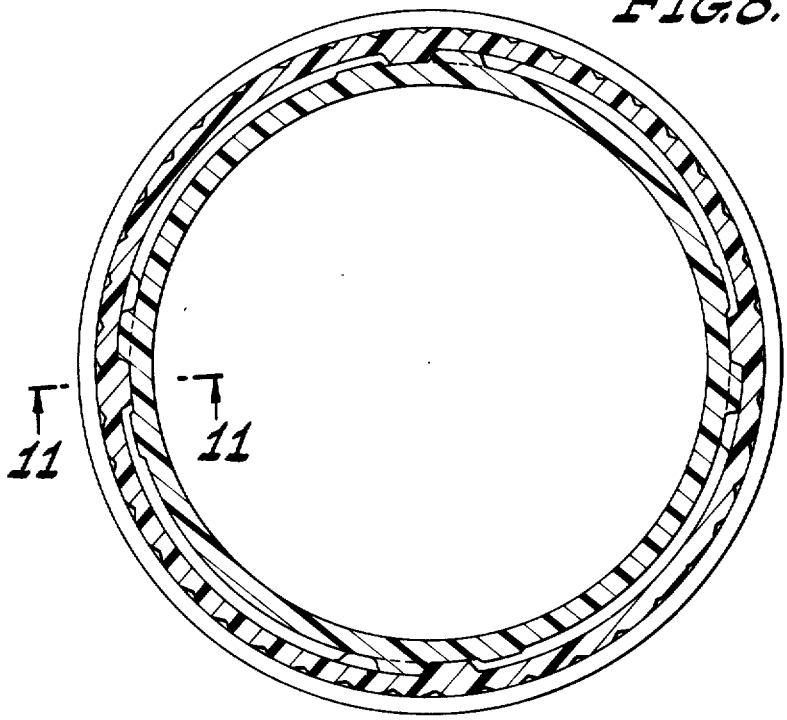
FIG. 8 is a plan sectional view taken along line 8—8 of FIG. 7.
Figure 9:
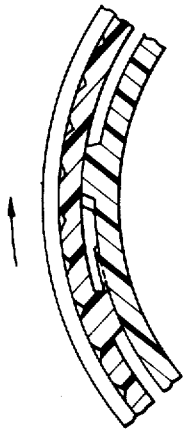
FIGS. 9 through 12 show further views of the cap and container of FIGS. 7 and 8.
Figure 10:
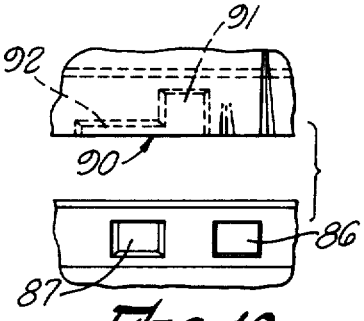
Figure 11:
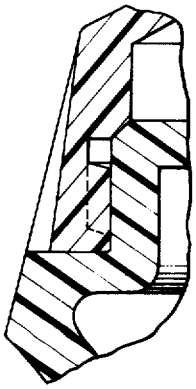
Figure 12:
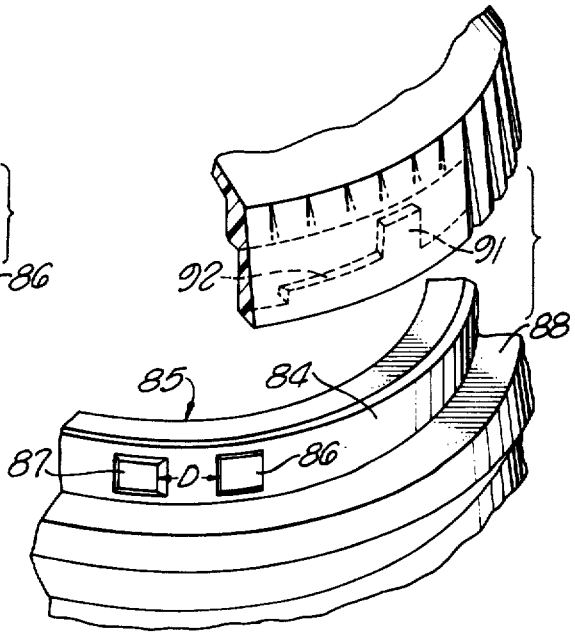

Turning now to FIG. 1, the sprayer of the subject invention is identified generally by the number 10 and is seen to be received on the upper end of an open topped container 11 into which fertilizers, insecticides, herbicides, or the like, are admixed with water in prescribed ratio prior to spraying onto lawns, shrubbery, trees or other plants. More particularly, the sprayer apparatus 10 is of unitary construction which includes a rotatable fitting 12 for connecting onto the male end of a garden hose, for example. Nozzle means 13 are rotatably adjustable for directing the spray in any one of several different spray patterns to be described. A manually actuated control 14 interconnects, in a way that will be more particularly described, valving means to provide water and premix materials from 11 to the nozzle 13 at several different flow rates and mixed in predetermined ratios. Actuation of mixing control button 15 directs a conical jet of water into the container 11 for initial mixing in a desired ratio with premix materials contained therein.

With reference now to FIG. 2, the container 11 is seen to have a relatively broad base and an open top, the latter optionally including lock lugs 16 or other suitable means for cooperating with the sprayer apparatus to effect what is sometimes termed a bayonet connection. This latter connection permits the container to be readily removed from and reconnected to the cap when filling with premix materials. The bottom wall 17 of the container 11 includes a centrally located well 18 within which a sediment trap 19, to be more fully described, is received and which also acts to locate the lower end of a feed tube 20 within the well and secure it against lateral displacement.

A cap or cover 21 is received onto the upper open end of the container 11 and includes either lock lug keyways or other projecting means 22 for cooperating with container lugs 16 to effect positive closure of the container. Upstanding wall means 23 on the cap are integrally formed with the cap 21 and have a water entrance side 24 including walls 25 defining a generally circular opening within which the swivel nut 12 is secured in a manner causing it to extend downwardly from the horizontal at an angle of approximately 15°, which angle provides a comfortable hand-hold when aiming the nozzle 13 generally horizontally. A second substantially flat face 26 of the member 23 extends vertically upward from the cap or cover with an opening 27 extending therethrough in fluid passing communication with the interior of the fitting or swivel nut 12. A centrally located opening or well 28 is formed in the face 26 for mounting other elements as will be described.

The fitting 12 preferably includes a gross particle filter or straining screen 29 and a pressure actuated check valve diaphragm 30, the latter preventing materials from moving backwardly through the fitting into the water supply line. Although the preferred construction offers certain distinct advantages to the overall operation of the subject sprayer apparatus, it is not a part of this invention as such and will therefore not be described in further detail.

The manually actuated control 14 interconnects with a generally cylindical drumlike body 31 having a conical, axially located opening 32 passing completely therethrough. As seen best in FIG. 3, the body 31 is a generally hollow tubular element as viewed along its cylindrical axis and has walls forming a pair of passages 33 and 34 extending generally parallel to the conical opening 32 and spaced radially outwardly from the body axis the same amount. Each of the passages 33 and 34 include associated radially directed orifices 35 and 36, respectively, communicating therewith and passing through the circumferential wall of the body 31.

Each cylindrical passage 33 and 34 receives respective tubular inserts 37 and 38 with different accurately formed bores extending axially therethrough. The outer walls of inserts include portions 39 which contact the inner wall surface of the associated passages 33 and 34 at spaced intervals, leaving the inserts otherwise spaced from the walls. It is also to be noted that the inserts when fully seated are spaced at their inner ends from the walls defining the associated passage as at 40. A water inlet opening 41 passing through the wall which abuts against 26 is provided in alignment with each insert bore, which openings 41 are selectively adjustable to align with a larger water inlet opening 27 in wall face 26. That is, with an insert fully seated in its respective passage, full fluid communication is maintained between the inlet openings 41 and 27, and the openings 35 and 36 as well as along the insert bore. The other or outer end of each insert extends well into nozzle for a purpose to be described later. Still further, the outer end surfaces of the walls defining each of the passages 33 and 34 are shaped to receive sealing means 42 such as an O-ring, for example. As will be described in detail later, the drumlike body 31 is adjustably positionable during use so that only one of the inserts at a time is in fluid communication via 41 and 27 to the pressurized source of water.

Assembly of the drumlike body 31 to the cap is accomplished through utilization of a mounting means 43 which is in the form of a pair of hollow studs or shanks 44 and 45, separated by a disclike wall 46 extending along the same axis and in opposite directions. In particular, the shank 44 tapers toward its outer end and is of such dimensions that it can be received within the passage 32 of the drumlike body 31 and has an outer end portion which extends beyond the body 31 for receipt within an accommodating circular shoulder 47 encompassing the opening 28. The relative dimensions of these parts are such that when the body 31 is received on the shank 44, in the manner just described, it freely rotates thereon, and at the same time fits closely against both the wall 26 and the disclike wall 46. An arcuate slot 48 in the disclike wall 46 aligns with each bore of the inserts 37 and 38 when they are arranged in the lowermost position, as the insert 38 is illustrated in FIGS. 3 and 6, for example. At the same time the associated lateral orifice 35 or 36, as the case may be, is aligned with a port 49 in the cap 21 communicating with the tube 20. Further sealing means such as the O-ring 50 maintains a continuous water-tight and air-tight condition about the openings 36 and 49 to prevent both premix materials from escaping outwardly and air leaking inwardly reducing the aspiration force on the premix materials.

The nozzle 13 is of substantially cylindrical shape with an open end 51, an exit or spray end 52, and internal walls defining four separate elongate chambers 53–56 arranged about the cylindrical axis. The spray end 52 is provided with four separate outlets 53'–56', each individually connected to correspondingly numbered chambers 53–56 for emitting water admixed with premix materials in a prescribed pattern. The nozzle also includes inner wall surfaces 57 defining an axial bore with a tapered portion for receipt onto the shank 45, as seen best in FIG. 2. When so received on the shank 45, the inner ends of the nozzle 13 slidingly abut against a peripheral flange 58 of the wall means 46. A threaded member such as a self-tapping screw 59, received within the shank bore, has its inner end threaded into the opening 28 and an enlarged head at the other end securing the nozzle onto the shank with washer 60 acting as a bearing spacer. When assembled as described, the nozzle is freely rotatable about the shank 45 as an axle to selectively align any one of the chambers 53–56 of the nozzle with the opening 48 in the wall 46. As seen best in FIG. 6, the lock lug 72 on the marginal portion of open end 51 engages the equally spaced detents 76 during rotation to position the nozzle in its described spraying modes.

With respect to operation of the spray apparatus as described to this point, assume the drumlike body 31 is adjusted to the position shown in FIG. 3. As shown there, a projecting embossment 61 on the outer surface of the body 31 on engaging an adjacent wall of the cap 21 locates the passage 34 in its lowermost position (see also FIG. 2) with its associated orifice 36 aligned with the opening 49 and thereby communicating with tube 20. Also, when in this position, the bore of the insert 38 is directly aligned with both the inlet water opening 41 and the arcuate slot 48 (FIGS. 2 and 6). Accordingly, irrespective of the adjustment mode of the nozzle, pressurized water provided to the fitting 12 makes its way directly through openings 27 and 41, insert bore 38 and out through the slot 48 for dispensing via the nozzle. Rotation of the drumlike body of member 31 approximately 80° detents the body in such manner that the other insert 37 is aligned in fluid passing relation.

As a further aspect of this invention, on comparing FIGS. 2 and 4, a transverse cylindrical opening 62 is formed in the cap body having one portion 63 which is of greater diameter than the remainder. A port 64 extends upwardly from the inner end of opening 62 communicating with the interior of the housing 23 closely adjacent the opening 41. An elongated side 65 received within the opening 62 has its inner end shaped into a piston which is slidingly received within the smaller diameter part of the opening 62. A second portion 66 spaced from the outer end thereof is shaped for sliding movement with the large diameter section 63. The outer end 68 defines the control button 15 shown in FIG. 1.

Movement of the control button 15 to its innermost position (full line depiction, FIG. 4) provides communication as shown by the arrows for the pressurized water through the port 64 and downward through tapered outlet 67, where it is emitted as an expanding conical jet into container 11. This flow into the container will be maintained as long as the push button is held in. Release of the push button 15 allows the water entering via opening 64 and pressing against the inner surface of 66 to drive the member 65 outwardly, thereby closing off the flow path between 64 and 67. The rate of water being added to the container may be controlled simply by holding the push button in varying amounts of depression, i.e., the farther it is pushed in, the greater the flow rate. Also, by merely holding the push button in, the necessary amount of water to be added to the container to provide any desired proportion of water to premix materials can be obtained over a continuous range. It is also important to note that the water emitted via 67 is a fast moving conical stream of jet, the action of which thoroughly mixes the premix materials with the water. Specifically, the outlet 67 is formed to create a conical jet that on reaching the bottom of the container has an effective diameter approximately one-half that of the container bottom.

As a safety and ease of handling feature, it is to be noted in FIG. 2 that at each side of the push button there are provided escape ports 69 and 70 extending through the cap. In the event of excessive filling or perhaps foaming or other working during mixing, these ports allow for escape of the material, but in a relatively low pressure stream, thereby preventing injury or staining of the user or his clothing by an inadvertent spray developing between the cap and container as can happen in some prior art equipment. Moreover, on release of the push button at the end of adding the required amount of water to the container, the water pressure moves the piston 65, and thus the push button, to its outermost position, thereby preventing overfilling of the container.

It is preferred that the container 11 be constructed of a transparent, nonbreakable plastic which is not only safe to handle, but allows for ready monitoring of the mixing to insure both accuracy and completeness.

As best seen in FIG. 2, the sediment trap 19 comprises generally an inverted cuplike strainer. The side walls include a plurality of opening slits 74 for admitting fluid to the interior thereof. The upper or top wall of the trap 19 is further provided with a recess 75 within which the lower end portion of the tube 20 is received. The walls 77 defining the recess 75 includes a single fine orifice 78 of predetermined dimensions serving as a proportion balance control through which the premix in the container is aspirated upwardly through the tube for entrainment within the spray. A fine mesh screen 79 surrounds orifice 78 for removing particulate matter not strained out by the slits 74 which might otherwise block the orifice and make it inoperative. The trap 19 also serves to maintain the tube end at a position closely adjacent the bottom of the container, insuring the use of substantially all the liquid mix in the container. The container bottom 17 is formed into several radially extending channels 80 which direct the premix liquid mixture to the sediment trap.

By having the proportion balance control orifice 78 located at the end of the tube 20, in the event the orifice becomes plugged, it is a simple matter to remove the tube and pluglike member for cleaning or replacement.

As noted previously, the nozzle 13 is provided with four different spraying modes. Although a number of different spraying modes may be provided on a single nozzle, for illustrative purposes only four are presented here. That is, on reference to FIGS. 2 and 5, spray outlet 53' provides a single stream or jet; outlet 54', an upwardly directed spray; and outlets 55' and 56', downwardly directed sprays of different angularity. As seen in FIG. 2, only one spray mode at a time is obtained and that is the one associated with the particular chamber 53–56 that is positioned in alignment with slot 48 in wall 46.

The spray pattern provided by each of the spray outlets 53'–56' has an associated droplet size achieved through deflecting the pressurized water off one or more angularly disposed wall surfaces prior to emission from the spray outlet. This is important in that for optimum performance there is a proper droplet size for each particular application. For example, water to be emitted from the outlet 55 (FIG. 2) is deflected from a first angular wall 81 in the nozzle onto a second angular wall 82 before exiting, whereas spray mixture coming from 53' (FIG. 5) is merely deflected off a single angularly disposed wall 83, making the droplet size in the latter case larger than in the first case. By locating the outer ends of the inserts 37 and 38 within the nozzle (FIG. 2) and closely adjacent the deflecting surfaces, optimum stream control is obtained.

In the practice of this invention, there is provided the ability for effecting initial mixture of the water and premix materials in a very accurate proportion by appropriate manipulation of the push button 15. Also, when producing the initial mixture in the container 11 in this manner, water emitted into the container is in the form of a jet which thoroughly agitates and mixes with the premix materials, eliminating the requirement for shaking or other means of insuring thorough mixture.

To insure against the liquid mixture leaking from the container at the cap, a special arrangement is used. The cap and container are preferably both made of plastic with the container being constructed of a softer and slightly more flexible material than the cap. Furthermore, the relative dimensions of the bayonet lugs on the cap and container are such that an interference is formed on threading which causes the upper edge 84 of the container to sealingly abut against the cap (FIG. 2).

In addition to the interference sealing relationship, in an alternate form of the invention the cap is locked onto the container top which prevents the cap from vibrating loose during use. With reference now to FIGS. 7 through 12, the open mouth of container terminates in a continuous circular rim 84, on the outwardly directed surface of which there is provided four equally spaced sets 85 of stops or lugs. More particularly, each set 85 consists of a first generally rectangular lug 86 which extends outwardly from the rim peripheral surface a first amount, and a second generally rectangular lug 87 located at a distance D from the first lug in a clockwise direction and extending outwardly a greater distance than the first lug. The lower edges of the two lugs of each set are spaced from an enlarged hub or shoulder 88 for a purpose to be described.

The inner surface of the cap rim 89 is provided with four sets of equally spaced locking lugs 90 for cooperative engagement with the corresponding sets 85 of stops or lugs on the container rim. Each locking lug 90 includes a first rectangular portion 91 of dimensions approximating those of lug 86 and a second elongated portion 92 extending in a forwardly turning direction (i.e., clockwise as viewed from above the cap) from lug 91. The width of 92 is such as to permit receipt between the lower edges of the lugs 86 and 87 and the hub 88.

To assemble the cap onto the container, the cap is lowered onto the container top with the leading edge of the portions 92 located behind each associated lug 86. Rotation of the cap clockwise moves the lug portion 92 between the lower edge of lugs 85 and 86 and the hub 88, thereby securing the cap against upward removal from the container. Further rotation causes the lug 91 to move into interfering relation with lug 86 and then into space D. Since the lug 87 extends outwardly of rim 84 farther than 86, it prevents further rotation of the cap. Removal of the cap is accomplished by counterclockwise rotation with sufficient force to overcome interference of 91 with 86.

As described above, the inserts 37 and 38 have respective bores of different fluid carrying capacities. Although these can be varied over a large range, it has been found that best results are obtained with present day premix materials for spraying of lawns when the insert bore of 38 effects a 60:1 mixture of water to the liquid mix in container 11. Similarly, the bore in 37 is of such dimensions as to produce a 24:1 ratio with the mixed materials in 11 for application to shrubs or the like. These inserts have been made removable for ease of manufacture and in order to insure repeated accuracy on large manufacturing runs of the bore size which is, of course, important to insure maintenance of fixed proportion of the water to materials being admixed therewith. Also, in the event it becomes advisable to provide a different bore size for, say, a special application, all that is required is to replace one (or both) of the inserts with one having the desired bore size and change the proportion balance control orifice.

Known prior devices of the general kind described here frequently were unsatisfactory due to leakage which usually occurred as a relatively high pressure spray either stained or was otherside injurious to the user or his clothing. The described spray apparatus was particularly constructed to prevent such leakage while at the same time not materially increasing production cost. Illustrative of this is the use of a pair of concentrically arranged O-rings 93 and 94 located about water inlet 27 in the surface 26 and sealing against leakage along the rotor facing surface. Moreover, by virtue of the described spray apparatus construction, no gaskets are required although the device is fully sealed against undesirable leakage such as, for example, between the moving parts between the cap and the container.

Recapitulating on overall operation of the subject invention, water is first mixed with the premix materials in the desired proportion by depressing the push button 15 to obtain the requisite amount of fill. The nozzle is then rotated to the desired spray pattern and direction, and the manual control moved from the OFF position (vertical as shown in FIG. 1) to align either passage 33 or 34 (dashed line and solid line depiction in FIG. 3) with the inlet pressurized water. As water moves through the bore of the selected insert 37 or 38, the accurately formed venturi creates a partial vacuum in the space 40, opening 35 or 36, as the case may be, and opening 49 to draw up to previously mixed materials through the tube 20 and proportion balance control orifice 78, and further mix with water for ultimate spraying out the nozzle 13. To stop operation, the control 14 is merely returned to the vertically up or OFF position, after which the influent pressurized water should be turned off before the spray apparatus is removed from the hose.

In the practical embodiment of the described spray apparatus changing from one flow rate to a second flow rate merely required rotation of the drumlike body 31 through approximately 80°. This advantageously contrasts with certain prior art apparatus requiring rotation of a selector through approximately 360° to achieve flow rate modification.

We claim:

1. Apparatus for mixing a liquid with pressurized water and providing a spray thereof, comprising:

an open-topped container for receiving a quantity of said liquid;

a cap carried by said container including means for connecting the cap to a supply of pressurized water with a water inlet opening in communication with said pressurized water and further having a port communicating with the container interior;

a cylindrical body rotatably mounted on said cap including first and second passages extending through said body, arranged to be individually aligned with said water inlet opening at respective different positions of rotation, said body having walls defining first and second openings interconnecting the respective first and second passages to the body exterior and so located as to align with the port in said cap when the respective passage is aligned with the water inlet opening;

a nozzle interconnected with said cylindrical body for ejecting a spray; and a single, open-ended, hollow tube carried by said cap having one open end interconnected with said port in said cap and the other open end extending into said container, said tube other end terminating in means having an opening for receiving liquid from the container and said opening in said means having a lesser sectional area than that of the tube one open end or that of the port in said cap.

2. Apparatus as in claim 1, further comprising manually operated valving means for directing a pressurized water stream from said water inlet opening in said cap into said container.

3. Apparatus as in claim 1, in which said nozzle is rotatably adjustable to provide any one of at least two different fixed spray patterns.

4. Apparatus as in claim 1, in which said nozzle is individually adjustable with respect to said cylindrical body for selectively ejecting spray in at least two different patterns.

5. A device for proportioning pressurized water with another liquid and forming a spray outlet, comprising:

an open-topped container means for receiving a quantity of said liquid;

a cover mounted onto said container top having means for connection to a supply of said pressurized water and including a first open communicating with said pressurized water and a second opening communicating with the container interior;

a cylindrical body rotatably mounted on said cover having a pair of passages extending therethrough generally parallel to the axis of rotation, each aligned at a different rotating position of said body with the first opening in said cover and lateral openings interconnecting each said body passage and the body exterior, said lateral openings communicating with the cover second opening when the associated cylindrical body passage is aligned with said first opening; and insert means removably received within each of said pair of body passages, each insert including walls defining a bore passing therethrough generally parallel to said passages.

6. A device for proportioning pressurized water with another liquid in an open-topped container and forming a spray, comprising:

a cover removably mounted onto said container top for connection to a supply of said pressurized water and including first means communicating with said pressurized water and second means communicating with the container interior;

a drumlike body rotatably mounted to said cover having a pair of passages extending therethrough generally parallel to the axis of rotation, each passage being aligned at a different rotative position of said body with the first communicating means in said cover, and a lateral opening interconnecting each body passage with the body exterior, said lateral openings respectively communicating with the cover second communicating means when the associated cylindrical body passage is aligned with said first communicating means; and individual inserts removably received within each of said pair of body passages, each insert including walls defining a bore passing therethrough generally parallel to said passages, said bores being of different predetermined cross-sectional areas.

7. A device as in claim 6, in which there are further provided manually operated valving means continuously adjustable over a range to direct pressurized water from the first communicating means into said container.

8. A device as in claim 6, in which there are further provided manually operated valving means carried by said cover selectively adjustable to direct a relatively high-pressure water stream into the container for agitating and mixing with the contents thereof.

9. A device as in claim 6, in which said container is constructed of a material more pliable than said cover and the relative dimensions of said container top and cover are such that when said cover is received on said container top interference occurs forming a water-tight seal therebetween.

10. A device as in claim 6, in which said container top and cover includes lugs and grooves which cooperate to provide a bayonet connection when said cover is mounted onto said container top.

11. A device as in claim 6, in which said container is constructed of a transparent material, thereby providing visual monitoring capability of mixing within said container.

12. A device as in claim 6, in which there are further provided manually operated valving means continuously adjustable over a range to direct the pressurized water from the first communicating means into said container at a correspondingly [continuoustly] *continuously* variable rate.

13. A device for proportioning pressurized water with another liquid and forming a spray outlet, comprising:

an open-topped container having side and bottom walls for receiving a quantity of said liquid;

a cover mounted onto said container top for connection to a supply of said pressurized water;

a cylindrical body rotatably mounted on said cover having a first passage extending therethrough generally parallel to the axis of rotation, communication with said pressurized water, and a lateral opening interconnecting said first passage with the interior of said container;

a hollow tube having one end connected to the lateral opening and its other end located immediately adjacent the center of the container bottom wall for drawing liquid from the container; and said container bottom wall including a plurality of channels extending outwardly from the center of said bottom wall.

14. A device as in claim 13, in which there are further provided first and second screenlike means enclosing the other end of said tube means, said first screenlike means enclosing said second screenlike means and having larger screen openings than said second means.

15. A device as in claim 13, in which the other end of said tube is positioned within a sediment trap, said trap including side walls having slits therein, a top wall having a first opening within which the other end of the tube is received, and a screenlike member located over the first opening and tube other end.

16. A device as in claim 13, in which the tube other end terminates in means communicating with the container liquid via an orifice having a smaller cross-sectional area than the tube bore.

17. In a hose end spray apparatus for receiving and spraying pressurized water and mixing a contained liquid therewith comprising a liquid container, a cap fittable on the container including means for connection to a source of pressurized water and a nozzle for ejecting a spray of mixed water and liquid, a hollow tube extending from the cap into the container for withdrawing liquid therefrom, the improvement comprising:

a rotor mounted in the cap for pivoting above an axis extending generally in a direction of water flow;

a plurality of passages through the rotor;

an aspiration opening in fluid communication with each passage and individually alignable in fluid communication with the feed tube in a respective pivot position of the rotor; and a removable insert in each passage having a predetermined bore size for mixing of said liquid with water in a predetermined ratio.

18. In a hose end spray apparatus as defined in claim 17, the further improvement wherein each aspiration opening comprises:

an inlet water opening in the rotor aligned with the bore in the respective insert;

means for spacing the insert away from the rotor adjacent the opening for defining an aspiration space; and means for providing fluid communication between said space and said aspiration opening.

19. In a hose end spray apparatus for receiving and spraying pressurized water and mixing a contained liquid therewith, comprising a liquid container, a cap fittable on the container including means for connection to a source of pressurized water and a nozzle for ejecting a spray of mixed water and liquid, and means for aspirating liquid from the container for mixing with the water, improved means for selectively directing pressurized water from the cap into the container, comprising:

a fluid passage having a relatively smaller diameter portion and a relatively larger diameter portion;

a piston in the passage having a seal around the periphery in the relatively smaller diameter portion and a seal around the periphery in the relatively larger diameter portion, and longitudinally movable in the passage between a depressed open position and an extended closed position;

a fluid outlet from the passage into the container between the larger and smaller seals in either position of the piston; and a fluid inlet from a pressurized water region of the cap into the passage between the smaller seal and the larger seal when the piston is in its open position and on the opposite side of the smaller seal from the larger seal when the piston is in its extended closed position.

20. A device for proportioning pressurized water with another liquid carried in an open-topped container and forming a spray therefrom, comprising:

a cover removably mounted onto said container top for connection to a supply of said pressurized water and including first means communicating with said pressurized water and second means communicating with the container interior;

a drumlike body rotatably mounted to said cover having a pair of passages extending therethrough generally parallel to the axis of rotation, each passage being aligned at a different rotative position of said body with the first communicating means in said cover, and a lateral opening interconnecting each body passage with the body exterior, said lateral openings respectively communicating with the cover second communicating means when the associated cylindrical body passage is aligned with said first communicating means, and said drumlike body preventing passage of water therethrough at all other rotative positions; and individual inserts removably received within each of said pair of body passages, each insert including walls defining a bore passing therethrough generally parallel to said passages, said bores being of different predetermined cross-sectional areas.

21. A device for proportioning pressurized water with another liquid and forming a spray outlet, comprising:

an open-topped container for receiving a quantity of said liquid therein and having walls defining a generally circular rim about the container open top;

a cover mounted onto said container top for connection to a supply of said pressurized water, said cover having a rim for cooperatively engaging the container rim;

a cylindrical body rotatably mounted on said cover having a plurality of passages extending therethrough generally parallel to the axis of rotation which individually communicate with said pressurized water at different positions of rotation, and a lateral opening interconnecting said first passage with the interior of said container; and a tube having one end connected to the lateral opening and its other end located immediately adjacent the center of the container bottom wall for drawing liquid from the container;

said container rim containing at least one pair of outwardly projecting lugs spaced circumferentially from one another and extending outwardly different amounts, and said cover rim having an inwardly projecting lug which is so dimensioned as to pass over the lesser projecting container rim lug with interference and to be obstructed by the greater projecting container rim lug, thereby locking the cover to the container against inadvertent removal.

22. A device for proportioning pressurized water with another liquid carried in an open-topped container and forming a spray therefrom, comprising:

a cover removably mounted onto said container top for connection to a supply of said pressurized water and including first and second water inlet openings of respective first and second cross-sectional areas and means communicating with the container interior;

a drumlike body rotatably mounted to said cover having a pair of passages extending therethrough generally parallel to the axis of rotation, each passage being aligned at a different rotative position of said body with a respective one of said first and second water inlet openings in said cover, and a lateral opening interconnecting each body passage with the body exterior, said lateral openings respectively communicating with the cover second communicating means when the associated cylindrical body passage is aligned with the said first or second water inlet openings; and individual inserts removably received within each of said pair of body passages, each insert including walls defining a bore passing therethrough generally parallel to said passages, said bores being of different predetermined cross-sectional areas and of lesser cross-sectional area than the corresponding first and second water inlet openings with which they are aligned for water passage therethrough.

23. Apparatus for mixing a liquid with pressurized water and providing a spray thereof, comprising:

an open-topped container for receiving a quantity of said liquid;

a cap carried by said container including means for connecting the cap to a supply of pressurized water with a water inlet opening in communication with said pressurized water and further having a port communicating with the container interior;

a cylindrical body rotatably mounted on said cap including first and second passages extending through said body, said passages containing first and second inserts, respectively, having different sized bores extending therethrough, said passages and the bores of the inserts received therein arranged to be individually aligned with said water inlet opening at respectively different positions of rotation of the cylindrical body, said body having walls defining first and second openings interconnecting the respective first and second passages to the body exterior and so located as to align with the port in said cap when the respective passage is aligned with the water inlet opening;

a nozzle interconnected with said cylindrical body for ejecting a spray; and a hollow tube carried by said cap having an end interconnected with said port in said cap and the other end extending into said container, said tube other end terminating in means having an opening for receiving liquid from the container and said opening in said means having a lesser sectional area than the port in said cap.

24. Apparatus for mixing a liquid with pressurized water and providing a spray thereof, comprising:

an open-topped container for receiving a quantity of said liquid;

a cap carried by said container including means for connecting the cap to a supply of pressurized water with a water inlet opening in communication with said pressurized water and further having a port communicating with the container interior;

a cylindrical body rotatably mounted on said cap including first and second passages extending through said body, arranged to be individually aligned with said water inlet opening at respective different positions of rotation, said body having walls defining first and second openings interconnecting the respective first and second passages to the body exterior and so located as to align with the port in said cap when the respective passage is aligned with the water inlet opening;

a nozzle interconnected with said cylindrical body for ejecting a spray; and a hollow tube carried by said cap having an end interconnected with said port in said cap and the other end extending into said container, said tube other end terminating in means having an opening for receiving liquid from the container and said opening in said means having a lesser sectional area than the port in said cap, said means being positioned within a sediment trap fixedly located in the bottom of said container.

25. In a hose end spray apparatus for receiving and spraying pressurized water and mixing a contained liquid therewith, including a liquid container, a cap fittable on the container with means for connection to a source of pressurized water and a nozzle for ejecting a spray of mixed water and liquid, and means for aspirating liquid from the container for mixing with the water, improved means for selectively directing pressurized water from the cap into the container, comprising:

a fluid passage in said cap interconnecting said pressurized water source with said liquid container;

a piston longitudinally oriented in and continuously movable along said passage from a first depressed position at which said pressurized water can move from the cap to said container to a second extended position where said piston closes said passage to the pressurized water;

a fluid outlet in said cap that interconnects the passage with the container throughout the full range of positions of the piston; and a fluid inlet that interconnects a pressurized water region of the cap with the passage when the piston is in its open position and prevents liquid flow therethrough to the container when the piston is in its extended closed position.

26. In a hose end spray apparatus for receiving and spraying pressurized water and mixing a contained liquid therewith, comprising a liquid container, a cap fittable on the container including means for connection to a source of pressurized water and a nozzle for ejecting a spray of mixed water and liquid, and means for aspirating liquid from the container to mix with the water, improved means for selectively directing pressurized water from the cap into the container, comprising:

a manually operated valving means continuously adjustable over a range to direct pressurized water from said cap into said liquid container at a correspondingly continuously variable rate.

* * * * *